United States Patent
Hosalli et al.

(10) Patent No.: US 8,185,454 B2
(45) Date of Patent: May 22, 2012

(54) METHOD AND SYSTEM FOR ASSIGNING AMORTIZABLE REVENUE COMPONENTS ASSOCIATED WITH A REVENUE BILL OF MATERIAL FOR AN ORDERED PRODUCT TO APPROPRIATE REVENUE ACCOUNTS

(75) Inventors: Tejaswini Girish Hosalli, Durham, NC (US); William J. Reilly, Cary, NC (US); Anil Shroff, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1448 days.

(21) Appl. No.: 11/696,511

(22) Filed: Apr. 4, 2007

(65) Prior Publication Data

US 2008/0249901 A1    Oct. 9, 2008

(51) Int. Cl.
*G07B 17/00*    (2006.01)
*G06Q 30/00*    (2012.01)
(52) U.S. Cl. ........... 705/30; 705/26.1; 705/26.5; 705/35
(58) Field of Classification Search ........ 705/26.1–26.9, 705/30
See application file for complete search history.

(56) References Cited

U.S. PATENT DOCUMENTS

| 7,890,391 B2 * | 2/2011 | Shah ................................ 705/30 |
| 7,912,793 B1 * | 3/2011 | Danzig et al. ................. 705/400 |
| 7,945,489 B2 * | 5/2011 | Weiss et al. ..................... 705/30 |
| 7,983,971 B1 * | 7/2011 | McLuckie et al. .............. 705/35 |
| 2002/0082911 A1 * | 6/2002 | Dunn et al. ..................... 705/14 |
| 2005/0240458 A1 * | 10/2005 | Ciacciarelli et al. ............. 705/8 |
| 2006/0085302 A1 * | 4/2006 | Weiss et al. ..................... 705/30 |
| 2006/0173780 A1 * | 8/2006 | Cline et al. ..................... 705/40 |
| 2007/0118444 A1 * | 5/2007 | Maga et al. ..................... 705/30 |
| 2007/0168209 A1 * | 7/2007 | Shah ................................ 705/1 |

OTHER PUBLICATIONS

New Version of Intec Convergent Billing and Customer Management Adds Class-Leading Revenue Management and Unified Billing/Customer Care Capabilities. (Nov. 16). Business Wire. Retrieved Jan. 10, 2012.*

* cited by examiner

*Primary Examiner* — Scott Zare
(74) *Attorney, Agent, or Firm* — Yee & Associates, P.C.; John R. Pivnichny (57) ABSTRACT

A system for unbundling revenue. In response to receiving an order for a product from a customer, a revenue bill of materials is determined for the ordered product. Amortization schedules are differentiated for revenue components within the bill of materials for the ordered product that require an amortization schedule. Then, each of the revenue components within the bill of materials are assigned to an appropriate revenue account.

20 Claims, 10 Drawing Sheets

| REVENUE BOM 902 | INVOICED AMOUNT | INVOICE CANCELLATION | CREDIT MEMO (PARTIAL QTY 5) 906 | BILL ONLY ORDERS WITH QTY OF 2 WITH REF TO INVOICE WITH QTY OF 10 ($102 PER 1 QTY) |
|---|---|---|---|---|
| HW 60% | 600.00 | 600.00- | 366 | 110.4 |
| SW1 20$ FIXED | 20.00 | 20.00- | 0 | 20.00 |
| SW2 20% | 200 | 200- | 122 | 908  36.8 |
| SPAC1 5% | 50 | 50- | 30.5 | 9.20 |
| SPAC2 5% | 50 | 50- | 30.5 | 9.20 |
| SPAC3 5% | 50 | 50- | 30.5 | 9.20 |
| SPAC4 5% | 50 | 50- | 30.5 | 9.20 |
| TOTALS | 1020 | 1020- | 610 | 204.00 |

INVOICED AMOUNT SEO REVENUE $1020 QTY 10

FIG. 9

REVENUE BOM 400

| ORDER LINE ITEM/ HIGHER ITEM | MATERIAL | REVENUE BOM | COMPONENTS | COMMENTS |
|---|---|---|---|---|
| 00010/00000 | 00P7959 | NONE | NONE | SERVICE (MTM IS IN THE CHARACTERISTIC VALUE) PRICED AT THIS LEVEL |
| 00020/00000 | SPBUN01 | SPBUN01 | | SERVICE PAC BUNDLE PRICED AT THIS LEVEL |
| 00030/00020 | 00P7959 | | MTMSP1 | MTM IS IN THE CHARACTERISTIC VALUE |
| 00040/00020 | 11N8581 | | MTMSP2 | MTM IS IN THE CHARACTERISTIC VALUE |
| 00050/00000 | XBUNDUS | XBUNDUS | | -SEO BUNDLE (HW/SW)<br>-PRICED AT THIS LEVEL |
| 00060/00050 | XMACHUS | | NONE | HW |
| 00070/00060 | 704061D | | 704061D | MTM (HW) |
| 00080/00050 | XSW0001 | | 5733M41 | SW (MTM IN MRP2 VALUE) |
| 00090/00000 | XSPBUNU | XSPBUNU | | -SEO BUNDLE WITH SERVICE PACS<br>-PRICED AT THIS LEVEL |
| 00100/00090 | XMACHUS | | NONE | HW |
| 00110/00100 | 704061D | | 704061D | MTM (HW) |
| 00120/00090 | XSW0001 | | 5733M41 | SW (MTM IN MRP2 VALUE) |
| 00130/00090 | 00P7959 | | MTMSP1 | MTM IS IN THE CHARACTERISTIC VALUE |

FROM FIG. 4A

REVENUE BOM 400

| | | | | |
|---|---|---|---|---|
| 00140/00090 | 11N8581 | | MTMSP2 | MTM IS IN THE CHARACTERISTIC VALUE |
| 00150/00050 | 00P7959 | NONE | NONE | -SERVICE PAC LINKED TO 00050 MTM IS IN THE CHARACTERISTIC VALUE ←422<br>-PRICED AT THIS LEVEL |
| 00160/00050 | SPBUN01 | SPBUN01 | | -SERVICE PAC-BUNDLE PRICED AT THIS LEVEL AND LINKED TO 00050 ←424<br>-PRICED AT THIS LEVEL |
| 00170/00160 | 00P7959 | | MTMSP1 | MTM IS IN THE CHARACTERISTIC VALUE |
| 00180/00160 | 11N8581 | | MTMSP2 | MTM IS IN THE CHARACTERISTIC VALUE |
| 00190/00000 | XMACHUS | NONE | NONE | -HARDWARE ORDERED ON ITS OWN<br>-PRICED AT THIS LEVEL |
| 00200/00190 | 704061D | | | MTM (HW) |
| 00210/00000 | XMACPUS | XMACPUS | | -HARDWARE ORDERED WITH PRELOADED SW<br>-PRICED AT THIS LEVEL |
| 00220/00210 | 704062D | | 704062D | MTM (HW) |
| 00230/00000 | XBUNPUS | XBUNPUS | | -SEO BUNDLE WITH PRELOADED HW/SW<br>-PRICED AT THIS LEVEL |
| 00240/00230 | XMACPUS | NONE | NONE | HARDWARE ORDERED WITH PRELOADED SW |
| 00250/00240 | 704062D | | 704062D | MTM (HW) |
| 00260/00230 | XSW0001 | | 5733M41 | SW (MTM IN MRP2 VALUE) |

410 → (first column)
412 → (second column)
414 → (third column)

FIG. 4B

EXAMPLE OF A SEO BUNDLE WITH SW THAT IS BTXX MATERIAL (NO SERVICE PAC MATERIALS):

```
        00010   SEOBTXX    1QTY   $100 (PRICED AT THIS LEVEL)
   500  00020   XMACHUS    1QTY   $000
        00030   704061D    1QTY   $000
        00040   XSW0001    1QTY   $000
```

THE REVENUE BOM IS AS FOLLOWS:
THE REVENUE BOM WOULD BE AS FOLLOWS:

```
        SEOBTXX            $100
                704061D    $60  ⎫
                                ⎬ 504
                5733M41    $40  ⎭
```

AND 5733M41 BEING A BTXX PRODUCT HAS ITS OWN REVENUE BOM WHICH IS AS FOLLOWS:

```
   502  5733M41
                BTXX001    $20  ⎫
                                ⎬ 506
                BTXX002    $20  ⎭
```

THE UNBUNDLING LOGIC WILL HAVE THE FOLLOWING ALLOCATIONS:

```
        704061D    $60  ⎫
        BTXX001    $20  ⎬ 508
        BTXX002    $20  ⎭
```

A. EXAMPLE OF SEO OPTIONS WHEN APPORTION LOGIC IS APPLIED:

802 {
CONSIDER A SEO OPTION THAT IS ORDERED "X123456" WITH A FEATURE "9300" WITH FEATURE QTY OF 1. THE QUANTITY ORDERED IS "100". DUE TO APPORTIONMENT LOGIC, 3 EOSE PLANT ORDER NUMBERS ARE CREATED WITH FEATURE QTY FIELD OF 50, 30, 20
1. EOSEOR1 WITH 50 QUANTITIES
2. EOSEOR2 WITH 30 QUANTITIES
3. EOSEOR3 WITH 20 QUANTITIES

B. ANOTHER EXAMPLE IS AN SEO OPTION THAT IS ORDERED "X123456" WITH A FEATURE "9300" WITH FEATURE QTY OF 2

804 {
THE QUANTITY ORDERED IS "100". DUE TO APPORTIONMENT LOGIC, 3 EOSE PLANT ORDER NUMBERS ARE CREATED WITH FEATURE QTY FIELD OF 100, 60, 40
1. EOSEOR1 WITH 100 QUANTITIES
2. EOSEOR2 WITH 60 QUANTITIES
3. EOSEOR3 WITH 40 QUANTITIES

C. DOWNSTREAM FINANCIAL SYSTEMS GET THE INFORMATION AT THE EOSE PLANT ORDER LEVEL

806 {
CALCULATE THE AMOUNT THAT NEEDS TO BE SENT TO THE DOWNSTREAM FINANCIAL SYSTEMS IN EACH OF THE SEGMENTS
IN CASE OF BOTH THE EXAMPLES I.E. ONE WITH FEATURE QTY OF 1, OR WITH FEATURE QTY OF 2, THE FINANCIAL SYSTEMS SHOULD BE EQUAL TO THE ORDERED QTY I.E. IN THE SECOND EXAMPLE THE ZZSEO_OPTQTY SHOULD BE 50, 30, 20, AND NOT 100, 60, 40 EACH QTY PRICED AT $300.00

808 {

| | | | | |
|---|---|---|---|---|
| E1FISEG | | | | |
| DMBTR | 820 → | $15,000 | $9,000 | $6,000 |
| MATNR | | X123456 | X123456 | X123456 |
| MENGE | | 1 | 1 | 1 |
| | | | | |
| Z1YSEG2 | | | | |
| | | | | |
| ZZTOPBILL | | X123456 | X123456 | X123456 |
| ZZTOPBILLQTY | 818 → | 100 | 100 | 100 |
| ZZMT | | 7040 | 7040 | 7040 |
| ZZMODELNUM | | 61D | 61D | 61D |
| ZZMACH_SER | | 0 | 0 | 0 |
| ZZEOSE | 810 → | EOSEOR1 | EOSEOR2 | EOSEOR3 |
| ZZFEATURE * | 816 → | 9300 | 9300 | 9300 |
| ZZRPQ * | | NA | NA | NA |
| ZZOLDMOD | | NA | NA | NA |
| ZZSEO_OPTQTY | 814 → | 50 | 30 | 20 |
| ZZSPRT_CONT | | NA | NA | NA |
| ZZSEO | 812 → | X123456 | X123456 | X123456 |
| ZZCRM | | Y | Y | Y |
| ZZORDINT | | X | X | X |

METHOD AND SYSTEM FOR ASSIGNING AMORTIZABLE REVENUE COMPONENTS ASSOCIATED WITH A REVENUE BILL OF MATERIAL FOR AN ORDERED PRODUCT TO APPROPRIATE REVENUE ACCOUNTS

BACKGROUND OF THE INVENTION

1. Field of the Invention

The present invention relates generally to an improved data processing system. More specifically, the present invention is directed to a computer implemented method, system, and computer usable program code for assigning revenue associated with a revenue bill of materials for an ordered product to appropriate revenue accounts in a product ordering system.

2. Description of the Related Art

Today, enterprise resource planning (ERP) systems integrate, or attempt to integrate, all data and processes of an enterprise or organization into a unified system. A typical ERP system will use multiple components of computer software and hardware to achieve this integration. ERP systems typically attempt to cover all basic functions of an organization, regardless of the organization's business or charter. For example, many large businesses, non-profit organizations, non-governmental organizations, governmental agencies, and other large entities utilize ERP systems. ERP systems are usually cross-functional and enterprise wide.

The computer software modules in an ERP may, for example, be: 1) manufacturing, which may include engineering, bills of material(s) (BOM), scheduling, capacity, workflow management, quality control, cost management, manufacturing process, manufacturing projects, and manufacturing flow; 2) supply chain management, which may include inventory, order entry, purchasing, product configurator, supply chain planning, supplier scheduling, inspection of goods, claim processing, and commission calculation; 3) financials, which may include general ledger, cash management, accounts payable, accounts receivable, and fixed assets; 4) projects, which may include costing, billing, time and expense, and activity management; 5) customer relationship management (CRM), which may include sales and marketing, commissions, service, customer contact, and call center support; 6) human resources, which may include payroll, training, time and attendance, and benefits; and 7) data warehouse management, which may include various self-service interfaces for customers, suppliers, and employees. In addition, ERP systems often deal directly with customers, eBusiness systems, such as, for example, eCommerce, eGovernment, eTelecom, and eFinance, and supplier relationship management (SRM) systems.

However, existing ERP systems only allow for revenue allocation and amortization of customer ordered products at the priced component level. Presently, a business need exists for products with multiple components and features to be ordered and priced as a single product, but which also allows for flexible sub-component revenue and amortization by the ERP system. Current ERP systems do not allow for pricing ordered products at a top BOM level and then for accounting the ordered products at a sub-component BOM level.

Therefore, it would be beneficial to have an improved computer implemented method, system, and computer usable program code for automatically assigning revenue components associated with a revenue BOM for an ordered product to appropriate revenue accounts.

SUMMARY OF THE INVENTION

Illustrative embodiments provide a computer implemented method, system, and computer usable program code for unbundling revenue. In response to receiving an order for a product from a customer, a revenue bill of materials is determined for the ordered product. Amortization schedules are differentiated for revenue components within the bill of materials for the ordered products that require an amortization schedule. Then, each of the revenue components within the bill of materials are assigned to an appropriate revenue account.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8 is a specific example of apportioning options for a single entity offering order in accordance with an illustrative embodiment;

DETAILED DESCRIPTION OF THE PREFERRED EMBODIMENT

Figure 1:
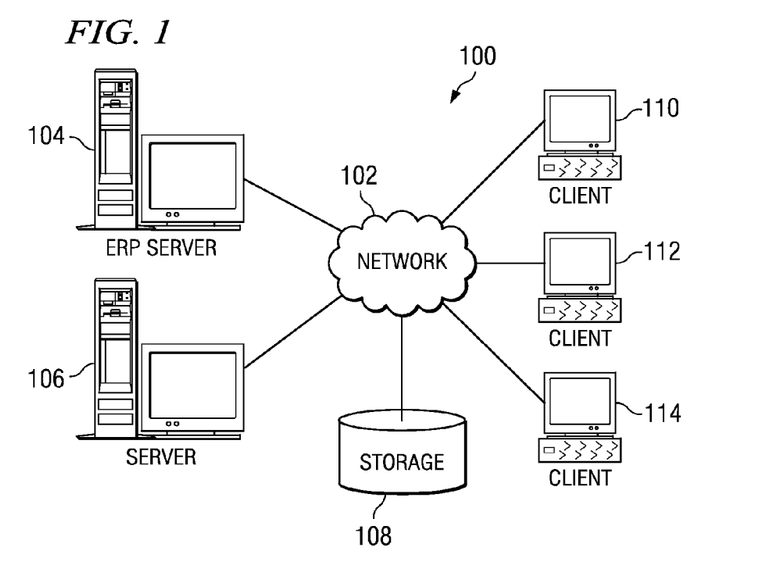
FIG. 1 is a pictorial representation of a network of data processing systems in which illustrative embodiments may be implemented.
Figure 2:
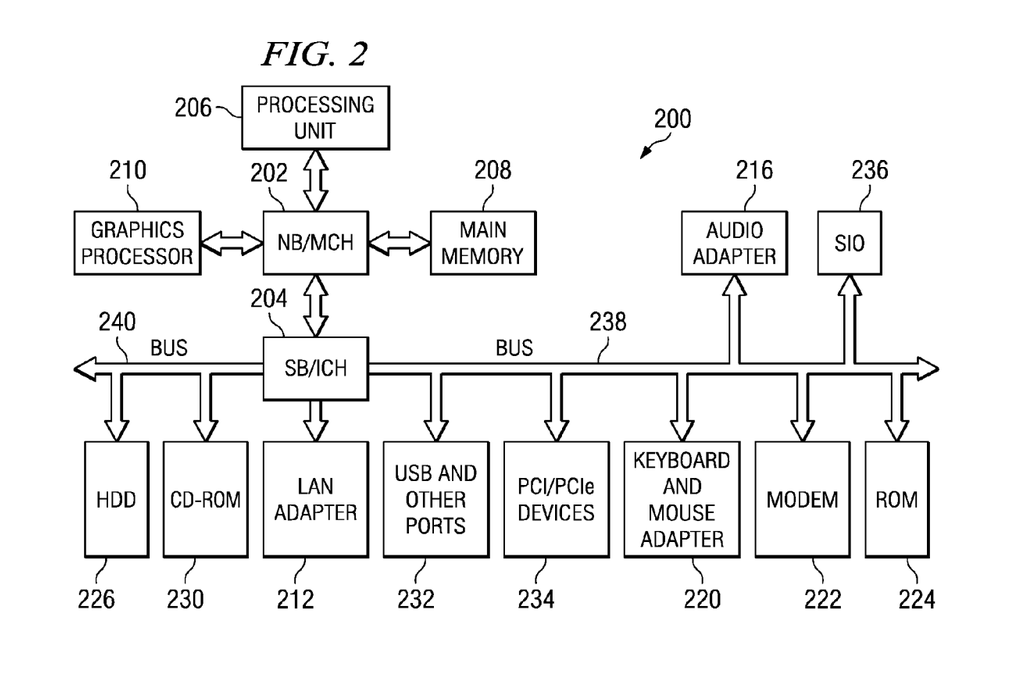
FIG. 2 is a block diagram of a data processing system is shown in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 may, for example, represent a product ordering system whereby customers order products online. Network data processing system 100 contains network 102, which is the medium used to provide communications links between various computers and other devices connected together within network data processing system 100. Network 102 may include connections, such as wire, wireless communication links, or fiber optic cables.

In the depicted example, server 104 and server 106 connect to network 102, along with storage unit 108. Server 104 may, for example, be an ERP server, which may be utilized by a business or enterprise to provide the capability to manage manufacturing, supply chain management, financials, projects, CRM, human resources, and data warehouse management.

Storage 108 may, for example, be a data repository for ERP server 104. The data contained within storage 108 may, for example, include all data necessary for the multiple computer software modules executing on ERP server 104 to perform their respective functions. In addition, the data also may include information, such as revenue BOM data for predefined products and customer configurable products. Storage 108 may, for example, store this data in one or more tables. However, it should be noted that storage 108 may store this data in either a structured format or an unstructured format.

A BOM describes a product in terms of the product's components, sub-components, basic parts, and features. In other words, a BOM is a list of parts, components, sub-components, and features of a product. A BOM may often contain hierarchical information. For example, in the case of a personal computer (PC), a top BOM level may only include the PC, itself. A sub-component BOM level may include sub-components of the PC, such as hardware, software, service agreements, and warranties used to complete the PC package. The BOM may define the product as the product is ordered and/or as the product is manufactured. A revenue BOM is a BOM that also includes all revenue data, such as sales revenue (fixed revenue, percentage revenue, priced revenue, and non-priced revenue), deferred revenue, and the like, relating to the ordered product. In addition, certain revenue BOM components may include amortization schedule data as required.

Clients 110, 112, and 114 also connect to network 102. Clients 110, 112, and 114 may be, for example, personal computers or network computers. In the depicted example, ERP server 104 may provide data, such as boot files, operating system images, and applications to clients 110, 112, and 114. Clients 110, 112, and 114 are clients to ERP server 104 in this example. In addition, clients 110, 112, and 114 may be used to order products from ERP server 104. Also, it should be noted that network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to NB/MCH 202. Processing unit 206 may contain one or more processors and may even be implemented using one or more heterogeneous processor systems. Graphics processor 210 may be coupled to NB/MCH 202 through an accelerated graphics port (AGP), for example.

In the depicted example, local area network (LAN) adapter 212 is coupled to SB/ICH 204 and audio adapter 216, keyboard and mouse adapter 220, modem 222, read only memory (ROM) 224, universal serial bus (USB) and other ports 232, and PCI/PCIe devices 234 are coupled to SB/ICH 204 through bus 238, and hard disk drive (HDD) 226 and CD-ROM 230 are coupled to SB/ICH 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). HDD 226 and CD-ROM 230 may, for example, use an integrated drive electronics (IDE) or serial advanced technology attachment (SATA) interface. A super I/O (SIO) device 236 may be coupled to SB/ICH 204.

An operating system runs on processing unit 206 and coordinates and provides control of various components within data processing system 200 in FIG. 2. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as HDD 226, and may be loaded into main memory 208 for execution by processing unit 206. The processes of the illustrative embodiments may be performed by processing unit 206 using computer implemented instructions, which may be located in a memory such as, for example, main memory 208, ROM 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in NB/MCH 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Illustrative embodiments provide a computer implemented method, system, and computer usable program code for unbundling revenue components in a product ordering system. First, a system administrator or user of an ERP server creates a revenue BOM for a plurality of products. Then, in response to receiving an order for a product from a customer, the ERP server determines a revenue BOM for the ordered product by utilizing the plurality of created BOMs. The plurality of created BOMs may be stored in a local or remote storage device.

In addition, the ERP server differentiates amortization schedules for revenue components within the revenue BOM for the ordered product that require an amortization schedule and then assigns each of the revenue components to an appropriate revenue account. An appropriate revenue account is a legal revenue account. A legal revenue account is an account for legally accounting for revenue from a particular revenue component of an ordered product.

Further, the ERP server creates an accounting document for the ordered product from the revenue BOM and the differentiated amortization schedules. Also, the ERP server sends the accounting document to one or more downstream applications. The one or more downstream applications are financial applications. Moreover, the ERP server sends an order response to the customer for the ordered product, which includes information generated at the ordering part level.

The revenue BOM includes a list of all the revenue components of the ordered product. The revenue components within the bill of materials for the ordered product may either be fixed revenue components or percentage revenue components. A fixed revenue component may, for example, be a sale price of an ordered product or a royalty collected for a third party software manufacturer. A percentage revenue component may, for example, be a percentage of the total sale price of the ordered product accounted to software that is manufactured by the business.

Also, the revenue components within the bill of materials for the ordered product may be priced revenue components or non-priced revenue components. The non-priced revenue components may, for example, be revenue accounted from the total sale price of the ordered product to a service agreement or a warranty for the ordered product. The ordered product may, for example, be a configurable product or a predefined product. A configurable product is a product, such as a computer, that a customer configures according to the customer's requirements during the ordering process. A predefined product may, for example, be a single entity offering. A single entity offering is a predefined bundle of assemblies, sub-assemblies, and/or features that comprise an ordered product. An algorithm is used to unbundle the revenue components within the BOM for the ordered product. The revenue components also may include revenue sub-components.

Specific product offerings may include hardware, software, service agreements, and warranties that have a duration of multiple years. The pricing organization, or sales department, may request that specific multiple year software, services, and warranty offerings be modified from a financial perspective to allow the revenue, which is initially deferred, to be recognized over the length of the amortizable periods. Thus, illustrative embodiments send predefined portions of the product's revenue to separate hardware, software, and service revenue accounts. The different revenues are assigned to an appropriate account, referencing an account for the deferrals and an account for the revenue recognition of the amortizable portions of the product's components. In addition, certain component revenue is not amortized over service periods, but may be recognized entirely in the month of the billing.

From a customer's perspective the change is transparent. While the customer's offering or product includes hardware, preloaded software, services, and warranties, the invoice to the customer does not display these components as separate invoice line items. Additionally, the invoice only shows the price of the bundled entity offering regardless of the revenue recognition and the accounting of sub-components of the total price.

For example, the total price of an ordered product may be 1000 USD, with the warranty on the ordered product attracting 200 USD of that 1000 USD price, which must be amortized. In this example, illustrative embodiments send the customer an order response, invoice/billing statement, or contract, which only includes the total price of the ordered product. However, even though illustrative embodiments only include the total price of the ordered product in the order response to the customer, illustrative embodiments account for the 200 USD amortizable warranty revenue in an appropriate revenue account for legal accounting purposes. The component revenue pricing is not shown to the customer because the customer is not concerned with these different revenue components. But, it should be noted that illustrative embodiments may optionally show the descriptions of non-priced options within the single entity offering as needed on the order response documents sent to the customer.

Illustrative embodiments allow for single entity offerings to be priced at the offering level, while allowing for flexible revenue differentiation and amortization scheduled periods for components that are built into the offerings. This means that non-priced components may have different revenue recognition on a percentage revenue basis or fixed revenue basis and may have different amortization scheduled periods. This process also allows for automation of royalty amount information. These revenue components may or may not be known by the customer and therefore illustrative embodiments allow for revenue and amortization accounting separate from whether the options or components are shown on customer interfacing documents.

Illustrative embodiments utilize the revenue BOM so that the division of components, if revenue, is defined. Illustrative embodiments also allow for differentiation of amortization time lengths for each component's sub-revenue. Illustrative embodiments use this method for allocating the different revenue component amounts within the revenue BOM for the ordered product into an appropriate legal revenue account.

Illustrative embodiments may be used by all business models and is not restricted to the high-tech industries. Also, illustrative embodiments allow sales teams to effectively market and price a product or offering, while allowing accounting teams to legally account for the product or offering at all levels. In other words, sub-components may be individually accounted to sales revenue and deferred revenue. In addition, sub-components and revenue may be separately amortized into deferred revenue over different scheduled periods.

Moreover, illustrative embodiments allow for flexible percentage allocation and fixed allocations in support of royalties. Further, automation of the deferred sub-component revenue amortization for the different product types, such as hardware, software, services, and warranty, is possible. This automation works for the complete order life cycle, such as, for example, order invoicing, customer billing, credit and debit adjustments, return adjustments, and the like. Furthermore, illustrative embodiments will only include customer relevant information in customer interfacing documents.

Figure 3:
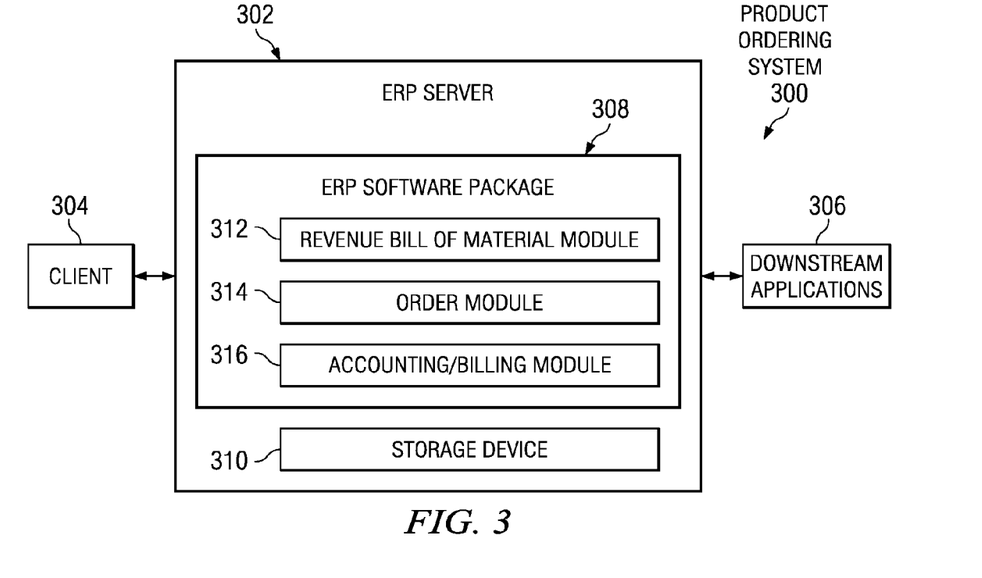
FIG. 3 is an exemplary illustration of a product ordering system in accordance with an illustrative embodiment.

With reference now to FIG. 3, an exemplary illustration of a product ordering system is depicted in accordance with an illustrative embodiment. Product ordering system 300 may, for example, be network data processing system 100 in FIG. 1. Product ordering system 300 includes ERP server 302, client 304, and downstream applications 306.

ERP server 302 may, for example, be ERP server 104 in FIG. 1. ERP server 302 includes ERP software package 308 and storage device 310. ERP software package 308 contains a plurality of computer software modules to provide a plurality of business functions for ERP server 302.

ERP software package 308 includes bill of materials module 312, order module 314, and accounting/billing module 316. A system administrator or user of ERP server 302 utilizes BOM module 312 to create and define a plurality of BOMs for predefined products and customer configurable products. In addition, BOM module 312 allows for multiple layer BOM structures. One of the multiple BOM layers may be an amortizable material layer. An example of an amortizable material is a free three year on-site warranty for a customer ordered product, such as a laptop computer. From an accounting perspective, the revenue for such a multiple layer BOM structure has to be accounted for as sales revenue (the laptop computer, itself) and deferred revenue (the three year on-site warranty).

This type of accounting setup leads to revenue components, revenue breakdown structures (process structures), amortization schedules, and pricing for components of the ordered product. Further, using this type of accounting setup allows for non-priced components to have different revenue recognition, such as, for example, a percentage revenue basis or a fixed revenue basis, and different amortization schedules.

BOM module 312 stores the created and defined revenue BOMs for the predefined products and customer configurable products in storage device 310. Storage device 310 is a nonvolatile data storage device and may store this revenue BOM data for the predefined products and customer configurable products in, for example, one or more tables. In addition, the system administrator may use storage device 310 to also store prices for all products, components, features, and services provided by the enterprise, along with all amortization schedules and tables. However, it should be noted that ERP server 302 may store all of this data in a remote storage device, such as storage 108 in FIG. 1, in addition to, or instead of, storage device 310.

ERP server 302 uses order module 314 to receive and process orders from customers for products. After receiving a customer order for a product, order module 314 creates an order for the customer at the ordering part BOM level. Order module 314 creates the customer order by accessing the one or more tables containing the revenue BOM data within storage device 310. Then, order module 314 sends a high level BOM order response to the customer.

ERP server 302 uses accounting/billing module 316 to prepare accounting data, which includes revenue and amortization data, for ordered products. Accounting/billing module 316 prepares the accounting data by accessing the one or more tables containing the revenue BOM data within storage device 310. In addition, ERP software package 308 uses accounting/billing module 316 to prepare billing data, which includes prices for the ordered products. Further, accounting/billing module 316 assigns the revenue from each revenue component within the revenue BOM for the ordered product to an appropriate revenue account for accurate accounting business practices. Furthermore, accounting/billing module 316 sends the accounting data to downstream applications 306. Downstream applications 306 may, for example, represent financial and/or ledgering applications. Further, accounting/billing module 316 sends the billing data to respective customers that ordered products.

Client 304 may, for example, be client 110 in FIG. 1. Client 304 is a data processing system, such as a computer, PDA, or wireless telephone, which a user may utilize to send a product order to order module 314. The user of client 304 uses, for example, a graphical user interface (GUI) and a browser to communicate the order to ERP server 302 via a network, such as network 102 in FIG. 1. After sending the product order, client 304 receives an order response for the ordered product from ERP server 302. The order response received by client 304 may only include high level information regarding the ordered product. However, it should be noted that illustrative embodiments may include in the order response any or all pertinent data relating to each feature and/or component associated with the ordered product, which may include amortization schedules.

Figure 4A:
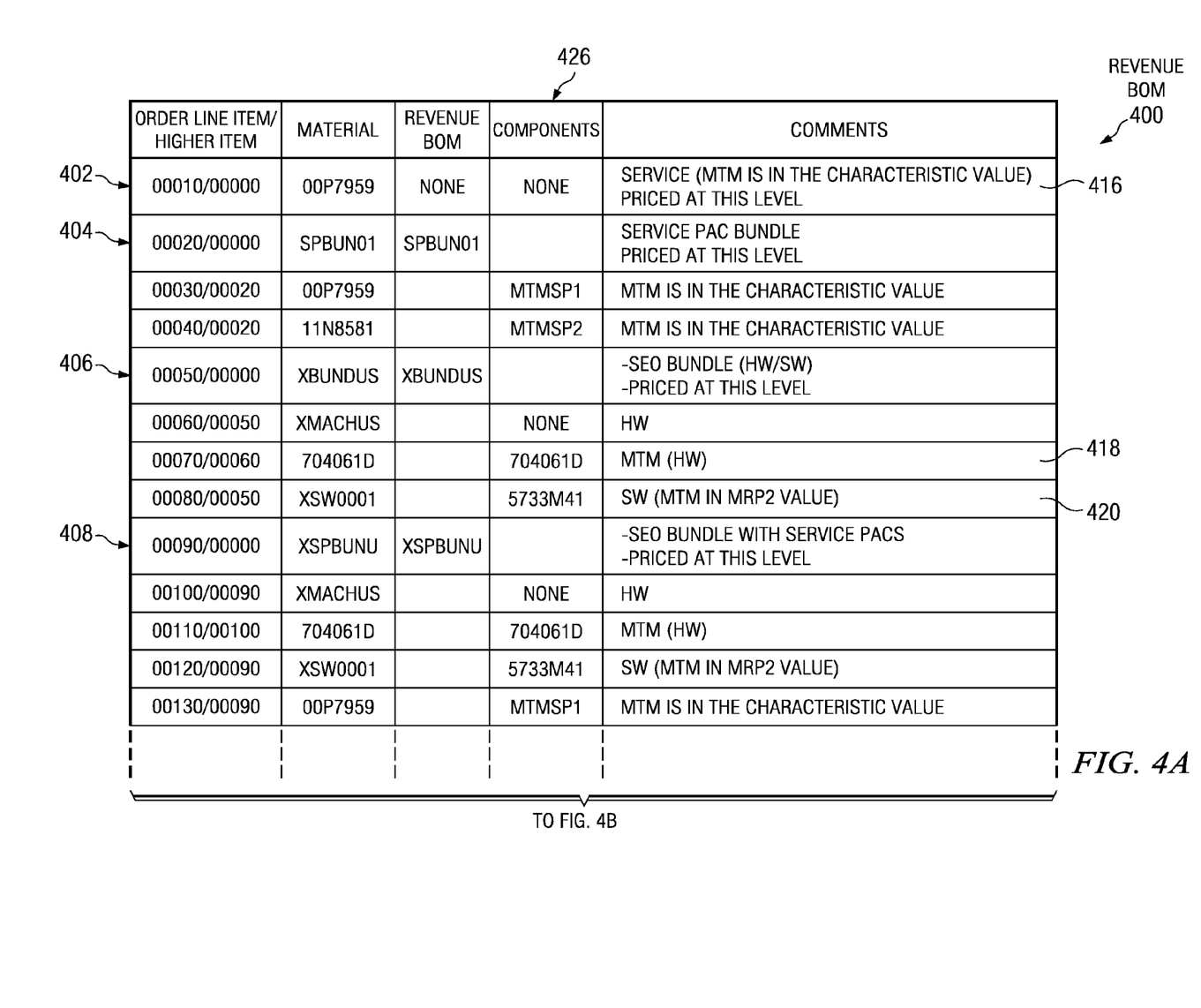
FIG. 4A and FIG. 4B is an exemplary illustration of revenue bill of materials for single entity offerings in accordance with an illustrative embodiment.
Figure 4B:
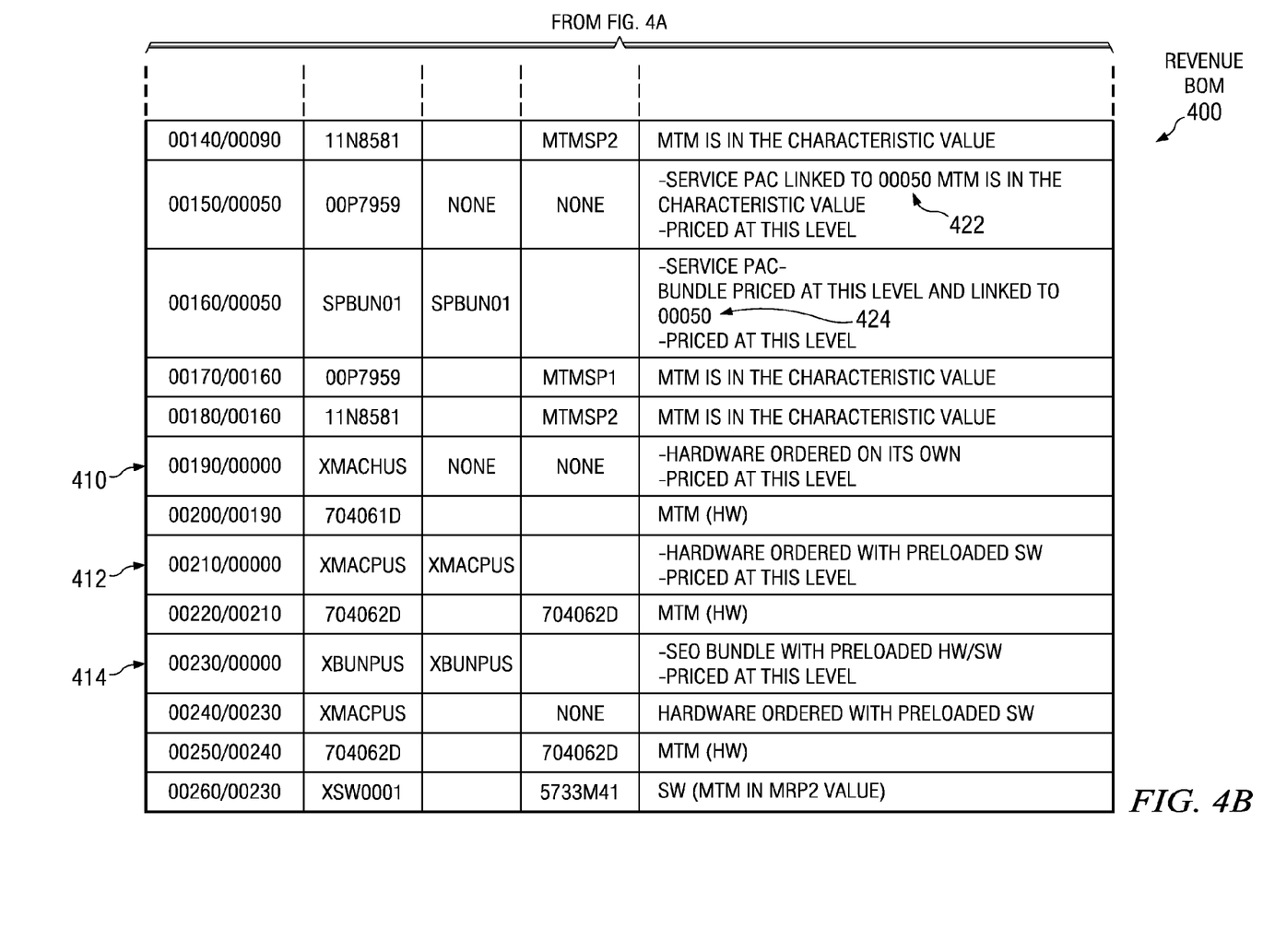

With reference now to FIG. 4A and FIG. 4B, an exemplary illustration of revenue bill of materials for single entity offerings is depicted in accordance with an illustrative embodiment. Revenue BOM 400 is a revenue BOM for a plurality of SEO orders, such as SEO order 402, 404, 406, 408, 410, 412, and 414. Revenue BOM 400 may include revenue components for services, hardware, and software. For example, SEO 402 includes service component 416. SEO 406 includes hardware component 418, software component 420, as well as, tied service components 422 and 424, which are order line items 00150 and 00160, respectively. Order line item 00160 is in itself a bundle of service components on order line items 00170 and 00180. In addition, SEO orders 404, 406, 408, 412, and 414 contain revenue components 426.

Figure 5:
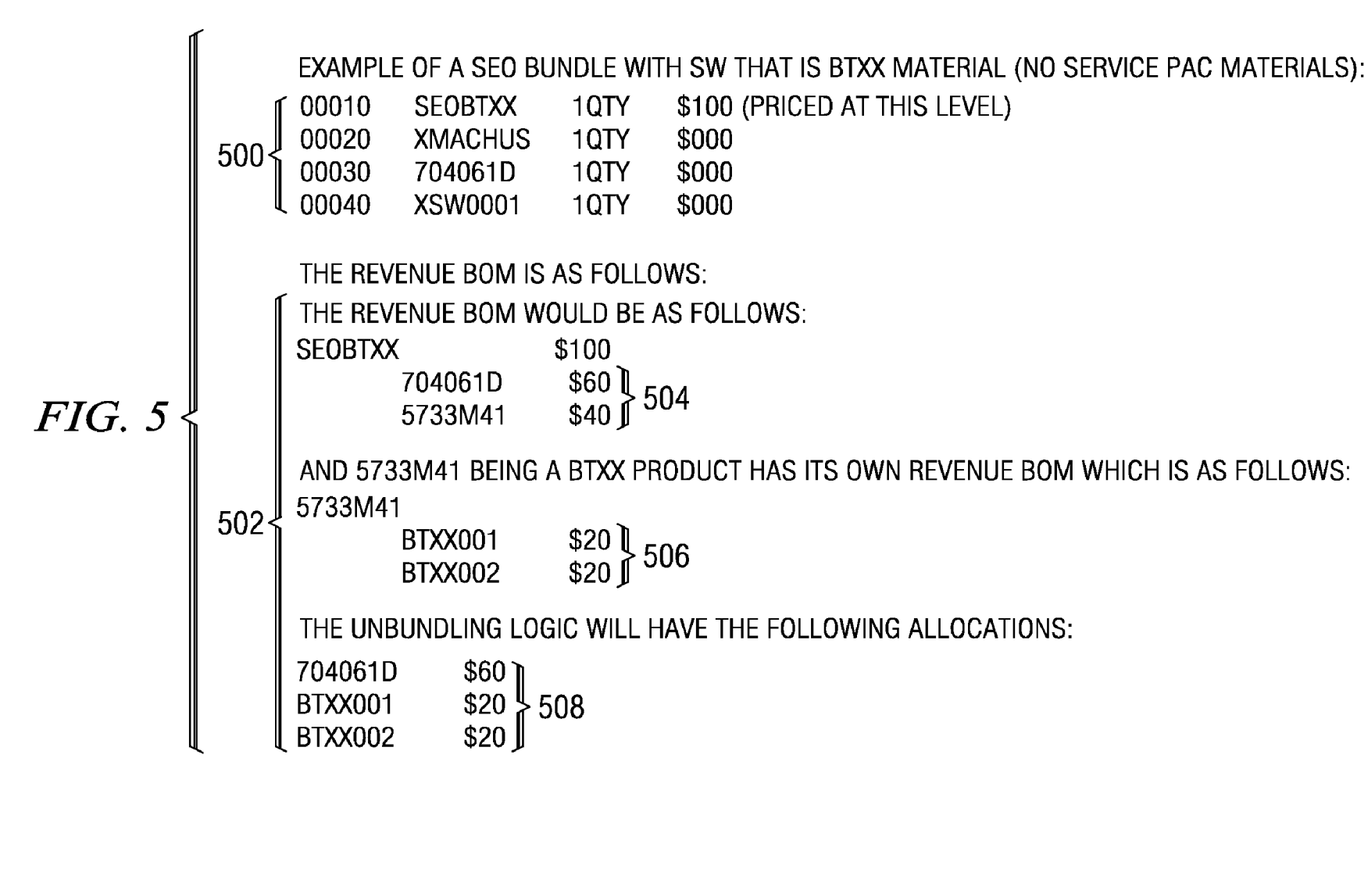
FIG. 5 is a specific example of a revenue bill of materials for a single entity offering order in accordance with an illustrative embodiment.

With reference now to FIG. 5, a specific example of a revenue bill of materials for a single entity offering order is depicted in accordance with an illustrative embodiment. SEO bundle 500 is an SEO bundle of components with software, which is a business template (BTxx) material and not a service pack material, for an ordered product. An SEO bundle may, for example, be a single hardware machine type with zero to n number of software products preloaded, a bundle of service packs, or a single hardware machine type with zero to n number of software products pre-loaded and service packs for the hardware. BTxx software do not exist in SEO nomenclature. Therefore, illustrative embodiments must unbundle the BTxx material, which may exist as the software component of the SEO bundle. Consequently, illustrative embodiments utilize an unbundling algorithm, such as, for example, unbundling algorithm 1100 in FIG. 11, which includes BTxx software.

SEO bundle 500 includes one SEOBTxx that is priced at 100 USD, one XMACHUS that is priced at 0 USD, one 704061D that is priced at 0 USD, and one XSW0001 that is priced at 0 USD. Revenue BOM 502 is the revenue BOM for SEO bundle 500. Revenue BOM 502 is a revenue breakdown structure for the revenue components of SEO bundle 500. In this specific example shown in FIG. 5, revenue components 504 include 60 USD for 704061D and 40 USD for 5733M41, which comprise the total 100 USD price for SEOBTxx. It should be noted that 5733M41 is the component for XSW0001 (Please see SEO orders 406, 408, and 414 within revenue BOM 400 in FIG. 4A and FIG. 4B). Revenue sub-components 506 include 20 USD for BTxx001 and 20 USD for BTxx002, which comprise the 40 USD for 5733M41. It should be noted that because 5733M41 is a BTxx material, 5733M41 has its own revenue breakdown structure.

Unbundled revenue 508 is the final unbundled revenue for SEO bundle 500. Unbundled revenue 508 includes 60 USD for 704061D, 20 USD for BTxx001, and 20 USD for BTxx002, which comprise the 100 USD total price for SEO bundle 500. Afterward, illustrative embodiments place the components of unbundled revenue 508 in an appropriate revenue account. For example, illustrative embodiments may place the revenue for 704061D in a hardware account and the revenue for BTxx001 and BTxx002 in a software account. Further, illustrative embodiments may account the hardware on a fixed or percentage revenue basis and the software on a fixed or percentage revenue basis.

Figure 6:
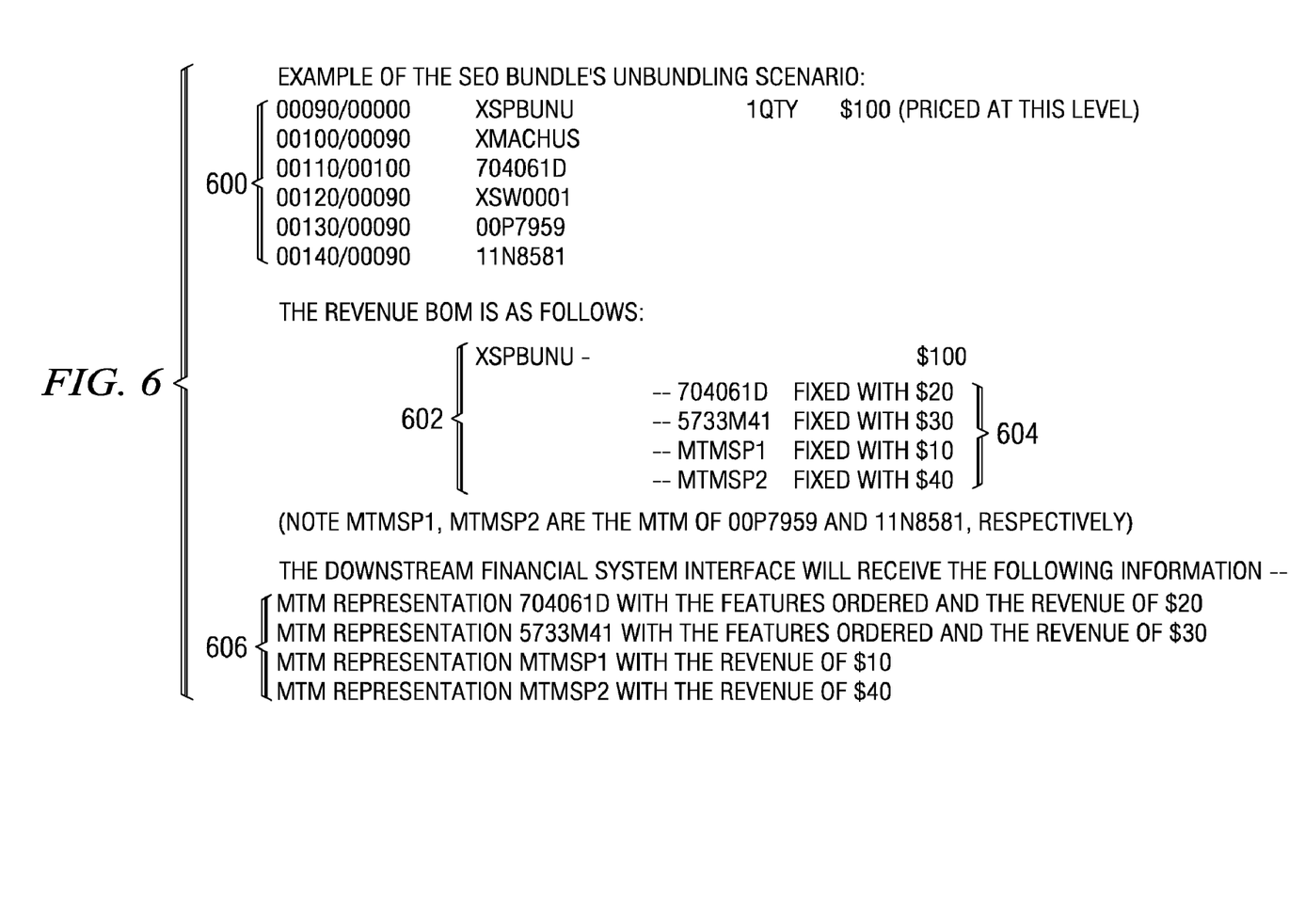
FIG. 6 is a specific example of revenue unbundling for a single entity offering order in accordance with an illustrative embodiment.

With reference now to FIG. 6, a specific example of revenue unbundling for a single entity offering order is depicted in accordance with an illustrative embodiment. SEO bundle 600 is an SEO bundle of components for an ordered product. SEO bundle 600 may, for example, be SEO order 408 in FIG. 4A and FIG. 4B.

SEO bundle 600 includes one XSPBUNU, which is priced at 100 USD. XSPBUNU includes one XMACHUS, one 704061D, one XSW0001, one 00P7959, and one 11N8581. Revenue BOM 602 is the revenue BOM for SEO bundle 600. Revenue BOM 602 is a revenue breakdown structure for the revenue components of SEO bundle 600.

In this specific example shown in FIG. 6, revenue components 604 are accounted on a fixed revenue basis. Revenue components 604 include 20 USD for 704061D, 30 USD for 5733M41, 10 USD for MTMSP1, and 40 USD for MTMSP2, which comprise the total 100 USD price for XSPBUNU. It should be noted that MTMSP1 and MTMSP2 are the components for 00P7959 and 11N8581, respectively (Please see SEO order 408 within revenue BOM 400 in FIG. 4A and FIG. 4B).

Revenue data 606 is the data that illustrative embodiments send to one or more downstream applications, such as downstream applications 306 in FIG. 3. The downstream applications may be financial and/or ledgering application. Revenue data 606 includes: Machine Type and Model (MTM) representation 704061D with the features ordered and the revenue of 20 USD; MTM representation 5733M41 with the features ordered and the revenue of 30 USD; MTM representation MTMSP1 with the revenue of 10 USD; and MTM representation MTMSP2 with the revenue of 40 USD.

Figure 7:
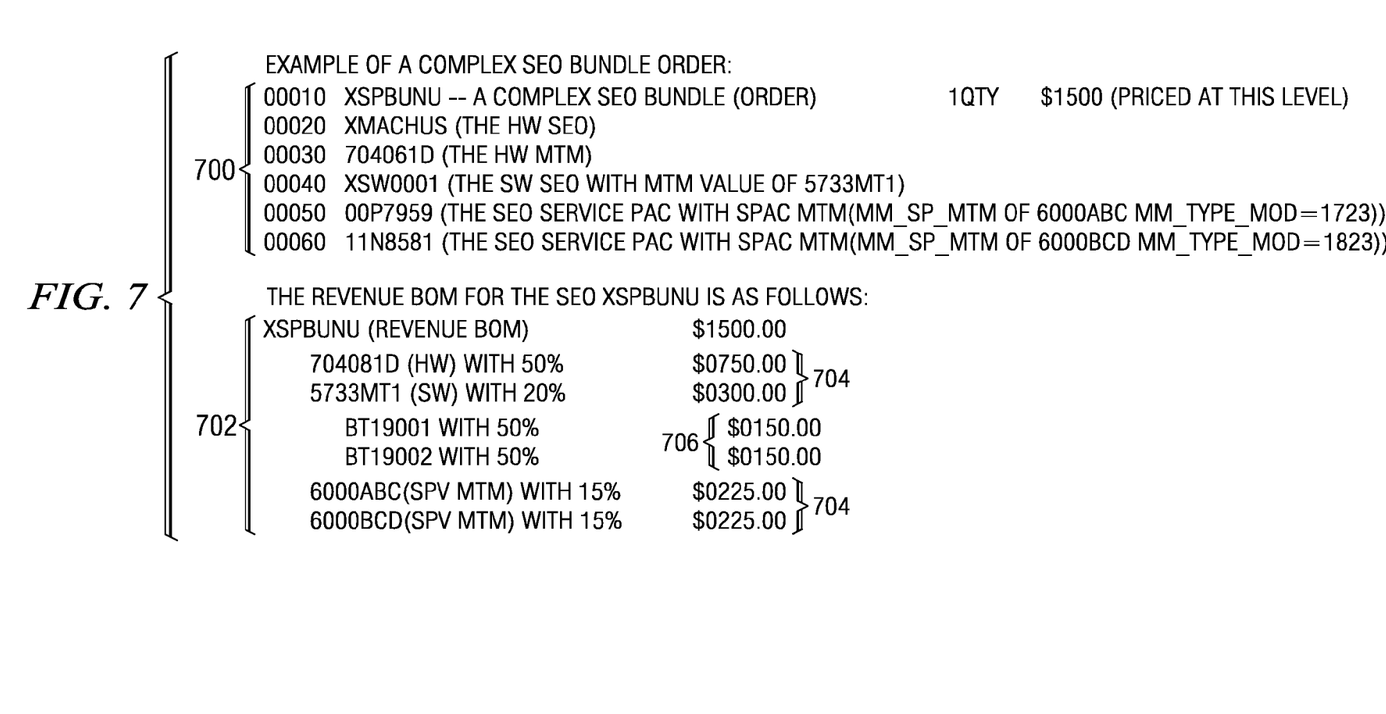
FIG. 7 is a specific example of a revenue bill of materials for a complex single entity offering order in accordance with an illustrative embodiment.

With reference now to FIG. 7, a specific example of a revenue bill of materials for a complex single entity offering order is depicted in accordance with an illustrative embodiment. Complex SEO bundle 700 is an SEO bundle of components for an ordered product. Complex SEO bundle 700 may, for example, be SEO order 408 in FIG. 4A and FIG. 4B.

Complex SEO bundle 700 includes one XSPBUNU, which is the complex SEO order and is priced at 1500 USD. XSPBUNU includes: one XMACHUS, which is a hardware SEO; one 704061D, which is a hardware MTM; one XSW0001, which is a software SEO with an MTM value of 5733MT1; one 00P7959, which is an SEO service pack with a SPAC MTM 6000ABC; and one 11N8581, which is another SEO service pack with a SPAC MTM 6000BCD. Revenue BOM 702 is the revenue BOM for complex SEO bundle 700. Revenue BOM 702 is a revenue breakdown structure for the revenue components of complex SEO bundle 700.

In this specific example shown in FIG. 7, revenue components 704 are accounted on a percentage revenue basis. Revenue components 704 include: 750 USD for hardware 704061D, which is 50% of the total price for the XSPBUNU; 300 USD for software 5733M41, which is 20% of the total price for the XSPBUNU; 225 USD for service pack 00P7959 MTM 6000ABC, which is 15% of the total price for the XSPBUNU; and 225 USD for service pack 11N8581 MTM 6000BCD, which is 15% of the total price for the XSPBUNU. Thus, revenue price components 704 comprise 100% of the total cost for XSPBUNU, which is 1500 USD.

However, it should be noted that because software 5733M41 is a BTxx material, 5733M41 has its own revenue breakdown structure. Consequently, revenue BOM 702 not only includes revenue components 704, but also includes revenue sub-components 706. Revenue sub-components 706 are the revenue sub-components for software 5733M41. Revenue sub-components 706 include 150 USD for BT19001, which is 50% of the 300 USD price for software 5733M41, and 150 USD for BT19002, which comprises the other 50% of the price for software 5733M41.

With reference now to FIG. 8, a specific example of apportioning options for a single entity offering order is depicted in accordance with an illustrative embodiment. SEO order 802 is an SEO order for option X123456 with feature 9300. The quantity of feature 9300 for SEO order 802 is one (1). In other words, each option X123456 includes 1 feature 9300. The total ordered quantity for SEO order 802 is one hundred (100). In other words, a customer ordered 100 option X123456 and each of the 100 option X123456 includes 1 feature 9300.

In this specific example of FIG. 8, an apportionment logic is used to process SEO order 802. The apportionment logic divides or breaks down the total ordered quantity of 100 for SEO order 802 into smaller quantities, such as 50, 30, and 20. The apportionment logic creates three enterprise order and supply execution (EOSE) plant order numbers for SEO order 802, which are EOSEOR1, EOSEOR2, and EOSEOR3, with quantities of 50, 30, and 20, respectively.

Also in this specific example of FIG. 8, an apportionment logic is used to process SEO order 804. SEO order 804 is an SEO order for option X123456 with feature 9300, but with a feature quantity of two (2). In other words, each option X123456 includes 2 feature 9300. Again, the total ordered quantity for SEO order 804 is 100. In other words, a customer ordered 100 option X123456 and each of the 100 option X123456 includes 2 feature 9300. This time the apportionment logic creates three EOSE plant order numbers for SEO order 804, which are EOSEOR1, EOSEOR2, and EOSEOR3, but with quantities of 100, 60, and 40, respectively.

However, it should be noted that illustrative embodiments are not limited to using an apportionment logic. Illustrative embodiments may process an entire ordered quantity without apportionment. In addition, the apportionment quantities used in the examples above are only for illustration purposes and are not meant as restrictions on illustrative embodiments. Illustrative embodiments may utilize any apportionment quantities necessary to accomplish processes of illustrative embodiments.

Downstream data 806 is an example of data that illustrative embodiments send to downstream applications, such as financial applications. Illustrative embodiments send downstream data 806 at the EOSE plant order level to the downstream financial applications or systems. However, it should be noted that in both the examples of SEO order 802 and SEO order 804, the quantity value sent to the downstream financial applications is equal to the total ordered quantity and not the feature quantity.

Table 808 is an example of downstream data sent to the downstream financial applications. Table 808 includes EOSE plant order numbers 810, option 812, option quantity 814, feature 816, total quantity 818, and price 820. In this specific example of FIG. 8, each quantity is priced at 300 USD. Consequently, price 820 for EOSEOR1, EOSEOR2, and EOSEOR3, is 15000 USD, 9000 USD, and 6000 USD, respectively.

Figure 9:
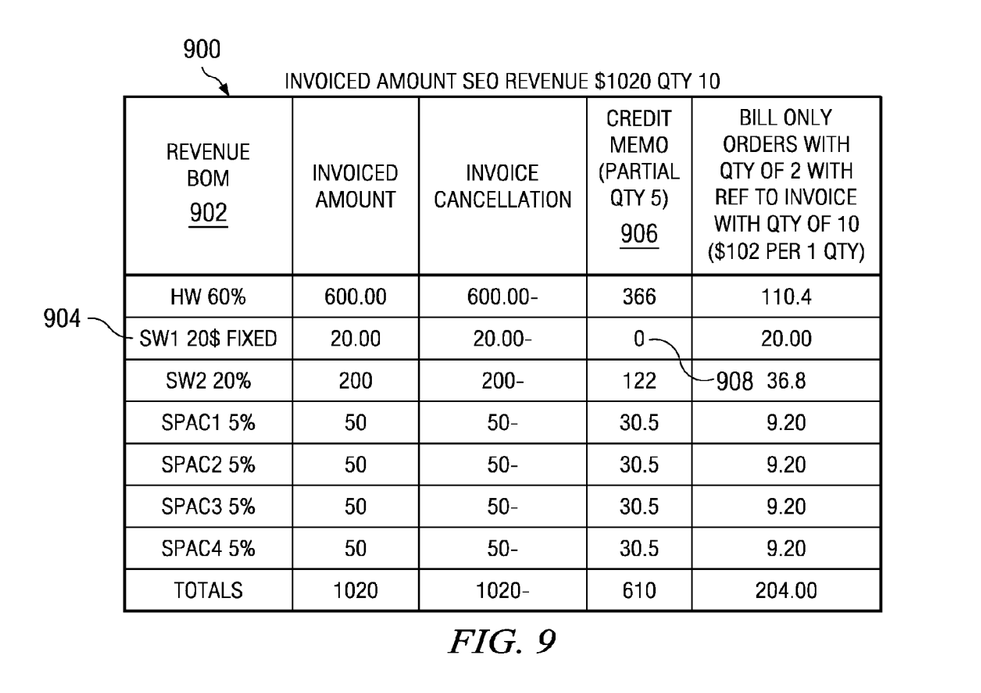
FIG. 9 is a specific example of a partial credit adjustment for a single entity offering order in accordance with an illustrative embodiment.

With reference now to FIG. 9, a specific example of a partial credit adjustment for a single entity offering order is depicted in accordance with an illustrative embodiment. Partial credit memo 900 is a credit memo for an SEO order, which has a revenue of 1020 USD and a quantity of ten (10). Each quantity is priced at 102 USD.

Revenue BOM 902 includes both fixed revenue and percentage revenue components for the SEO order. Fixed revenue 904 is the only fixed revenue component in revenue BOM 902. All other revenue components in revenue BOM 902 are percentage revenue components.

If a revenue BOM, such as revenue BOM 902, includes both fixed and percentage revenue components, then illustrative embodiments skip the fixed percentage components, such as fixed revenue 904, and allocate the credit only using the percentage revenue components. Credit 906 is the amount of credit given to the SEO order. In this particular example, the partial credit is for a quantity of five (5) or half the original order quantity. Illustrative embodiments distribute the partial credit across the percentage revenue components according to their respective percentage amounts. However, it should be noted that fixed revenue component 904 receives none of the partial credit allocation at 908.

When unbundling options for credit adjustments, illustrative embodiments send the plant order numbers to the downstream financial application when the credit adjustment documents are created. If credit adjustment documents are created with a reference to an order invoice, then a user selects the appropriate plant order numbers that need to be passed to the downstream financial application. For example, if an original order invoice that includes options is for a quantity of 100, the apportionment logic creates 3 plant order numbers, such as, EOSEOR1 (50 Qty), EOSEOR2 (30 Qty), and EOSEOR3 (20 qty). The credit adjustment in this example is for a quantity of 70. So, the user chooses EOSEOR1 and EOSEOR2 using, for example, a graphical user interface. Then, during financial system interface creation a quantity of 50 is sent with EOSEOR1 and a quantity of 20 is sent with EOSEOR2 to comprise the total credit adjustment of 70.

Document Types and whether these document types need to follow a full credit adjustment unbundling logic, a partial credit adjustment unbundling logic, or check for both may be entered in a check table. Certain document types need to be setup to always follow the partial credit adjustment unbundling logic. This type of document should not be used to create a credit adjustment document with reference to an order invoice because this type of document does not support a type model and feature product structure. Bill Only order document types should be setup to always follow the full credit adjustment unbundling logic immaterial of whether the Bill Only order document was created with reference or without reference to an order invoice.

Certain other document types need to be setup so that a check may be performed to see if the full credit adjustment unbundling logic needs to be applied. For example, if the adjustment document quantity is equal to the invoiced quantity and the adjustment document amount is equal to the invoiced amount, then the full credit adjustment unbundling logic is applied to the document. Conversely, if the adjustment document quantity is not equal to the invoiced quantity and the adjustment document amount is not equal to the invoiced amount, then the partial credit adjustment unbundling logic is applied to the document.

In other words, the full credit adjustment unbundling logic is only applicable when the adjustment document quantity is equal to the invoiced quantity and the adjustment document amount is equal to the invoiced amount. Illustrative embodiments unbundle as per the revenue BOM, i.e., inclusive of both fixed and percentage components. The partial credit adjustment unbundling logic only uses the percentage components of the revenue BOM and excludes the fixed components. If the credit adjustment is a full credit (i.e., credit memo qty=invoiced qty and credit memo amount=invoiced amount) for all document types except for the Bill Only orders, then unbundle using all the fixed and percentage components of the revenue BOM. If not a full credit, then unbundle only using the percentage components.

Figure 10:
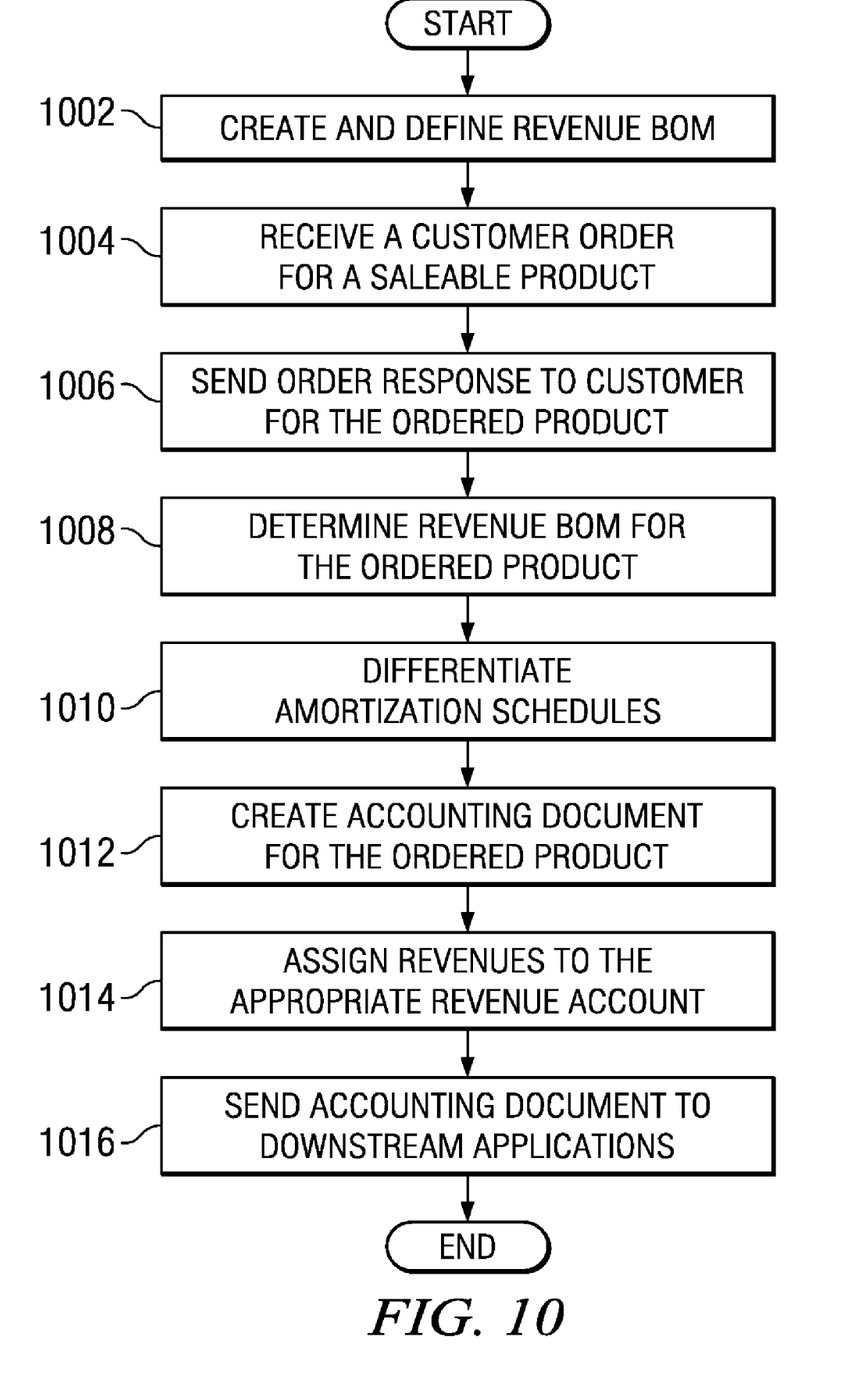
FIG. 10 is a flowchart illustrating an exemplary process for assigning revenue components associated with a revenue bill of materials for an ordered product to appropriate revenue accounts in accordance with an illustrative embodiment.

With reference now to FIG. 10, a flowchart illustrating an exemplary process for assigning revenue components associated with a revenue bill of materials for an ordered product to appropriate revenue accounts is shown in accordance with an illustrative embodiment. The process shown in FIG. 10 may be implemented in an ERP server, such as, ERP server 302 in FIG. 3.

The process begins when a system administrator or user utilizes a revenue BOM module, such as revenue BOM module 312 in FIG. 3, within the ERP server to create and define a revenue BOM for a plurality of products (step 1002). The plurality of created and defined revenue BOMs may be stored in a storage unit, such as, for example, storage device 310 in FIG. 3 and/or storage 108 in FIG. 1. Subsequently, the ERP server uses an order module, such as, for example, order module 314 in FIG. 3, to receive an order for a saleable product from a customer, such as client 304 in FIG. 3, via a network, such as, for example, network 102 in FIG. 1 (step 1004). A saleable product is a product that a business or enterprise offers for sale. The ordered saleable product is, for example, a customer configurable product or a preconfigured product and is priced at the ordering part level.

After receiving the customer order for the saleable product in step 1004, the order module sends an order response, such as, for example, an order or an invoice, to the customer for the ordered product (step 1006). The order module generates the order, which is sent to the customer, at the ordering part level. Subsequent to, or concurrent with, sending the order response to the customer in step 1006, the ERP server determines a revenue BOM for the ordered product (step 1008). The revenue BOM for the ordered product may, for example, be retrieved from the plurality of created and defined revenue BOMs stored in a storage location.

Then, the ERP server differentiates amortization schedules for each component of the determined revenue BOM for the ordered product that requires such an amortization schedule (step 1010). Amortization schedules may be created based on fixed revenue components and percentage revenue components. Revenue sub-components may be separately amortized into deferred revenue over different scheduled periods. After differentiating amortization schedules in step 1010, the ERP server employs an accounting/billing module, such as, for example, accounting/billing module 316 in FIG. 3, to create an accounting document, such as, for example, table 808 in FIG. 8 (step 1012). Subsequently, the accounting/billing module assigns each revenue component of the determined revenue BOM for the ordered product to an appropriate revenue account (step 1014). The revenue accounts may, for example, be a revenue account for hardware, a revenue account for software, a revenue account for service agreements, a revenue account for warranties, a revenue account for each division of the enterprise, a revenue account for fixed revenue, a revenue account for percentage revenue, a revenue account for each amortization schedule, a revenue account for sales revenue, a revenue account for deferred revenue, a revenue account for priced components, a revenue account for non-priced components, et cetera. However, it should be noted that illustrative embodiments may assign each of the revenue components of the determined revenue BOM for the ordered product to more than one appropriate revenue account.

Subsequent to, or concurrent with, assigning revenues to the appropriate revenue account in step 1014, the accounting/billing module sends the accounting document to one or more downstream applications, such as, for example, downstream applications 306 in FIG. 3 (step 1016). The one or more downstream applications may, for example, be financial applications. The process terminates thereafter.

Figure 11:
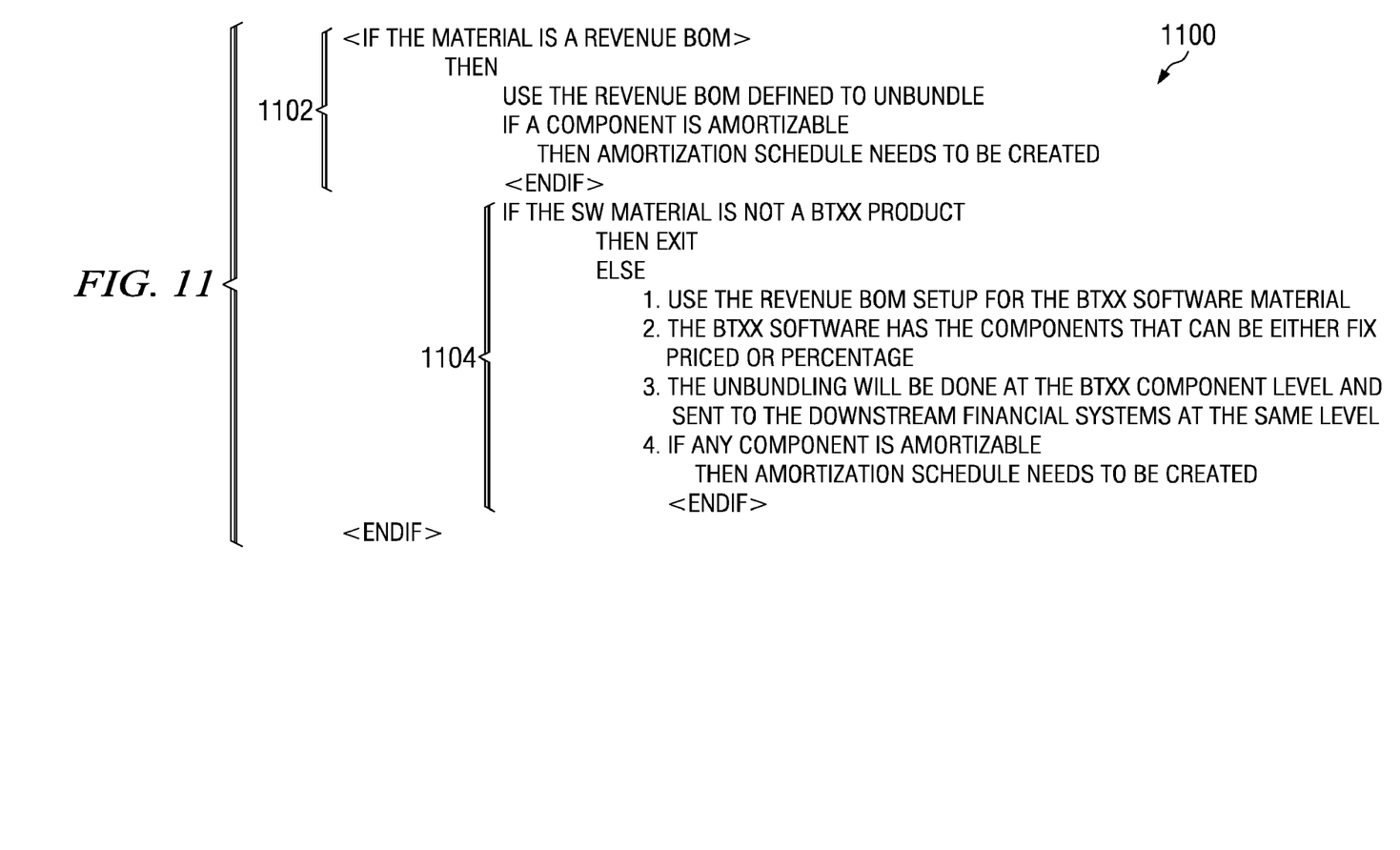
FIG. 11 is an exemplary algorithm for unbundling revenue components for an ordered product in accordance with an illustrative embodiment.

With reference now to FIG. 11, an exemplary algorithm for unbundling revenue components for an ordered product is depicted in accordance with an illustrative embodiment. Illustrative embodiments may locate exemplary unbundling algorithm 1100 within, for example, an ERP software package, such as ERP software package 308 in FIG. 3. However, illustrative embodiments are not limited to locating algorithm 1100 within the ERP software package. Illustrative embodiments may locate algorithm 1100 in any component or module within a computer capable of utilizing algorithm 1100.

It should be noted that algorithm 1100 is only intended as an example of one specific type of algorithm that may be utilized by illustrative embodiments for unbundling revenue components for an ordered product. In other words, illustrative embodiments are not restricted to the use of algorithm 1100. Any algorithm capable of accomplishing processes of an illustrative embodiment may be used based on business application and usage.

Algorithm 1100 contains 2 basic steps, step 1102 and step 1104. In step 1102, if the ordered product has a revenue BOM, then the unbundling logic uses the defined revenue BOM to unbundle the revenue components of the ordered product. In addition, if a revenue component of the revenue BOM is amortizable, then an amortization schedule is created for the revenue component.

In step 1104, if the software component in the revenue BOM is not a BTxx material, then the unbundling logic exits the process. Else, in step 1104, if the software component in the revenue BOM is a BTxx material, then the unbundling logic uses the revenue BOM structure for the BTxx material. BTxx material components may either be a fixed revenue (price) or a percentage revenue (price). Unbundling of the BTxx material components is done at the BTxx component level, such as, for example, revenue sub-components 706 within revenue BOM 702 in FIG. 7. Further, these unbundled BTxx material components are sent to downstream application, such as, for example, downstream applications 306 in FIG. 3, at the BTxx component level. Furthermore, if any BTxx material component is amortizable, then an amortization schedule is created for each component of the BTxx material that is amortizable.

Thus, illustrative embodiments provide a computer implemented method, system, and computer usable program code for automatically assigning revenue components associated with a revenue BOM for an ordered product to appropriate revenue accounts. The invention may take the form of an entirely hardware embodiment, an entirely software embodiment, or an embodiment containing both hardware and software elements. In a preferred embodiment, the invention is implemented in software, which includes but is not limited to firmware, resident software, microcode, et cetera.

Furthermore, the invention may take the form of a computer program product accessible from a computer-usable or computer-readable medium providing program code for use by or in connection with a computer or any instruction execution system. For the purposes of this description, a computer-usable or computer-readable medium may be any tangible apparatus that may contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a ROM, a rigid magnetic disk, and an optical disk. Current examples of optical disks include compact disk—read only memory (CD-ROM), compact disk—read/write (CD-R/W), and DVD.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, et cetera) may be coupled to the system either directly or through intervening I/O controllers.

Network adapters also may be coupled to the system to enable the data processing system to become coupled to other data processing systems, remote printers, or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for unbundling revenue, the computer implemented method comprising the steps of:

responsive to a computer receiving an order for a customer configurable product from a customer to form an ordered customer configurable product, determining, by the computer, a revenue bill of materials that lists revenue components for the ordered customer configurable product;

determining, by the computer, whether one or more of the revenue components within the revenue bill of materials for the ordered customer configurable product are amortizable;

responsive to a determination by the computer that one or more of the revenue components within the revenue bill of materials for the ordered customer configurable product are amortizable, generating, by the computer, an amortization schedule for each of the revenue components determined to be amortizable;

differentiating, by the computer, amortization schedules for each of the revenue components within the revenue bill of materials for the ordered customer configurable product that require the amortization schedule; and assigning, by the computer, each of the revenue components within the revenue bill of materials to an appropriate revenue account.

2. The computer implemented method of claim 1, further comprising the steps of:

creating, by the computer, revenue bill of materials for a plurality of customer configurable products based on user input to form a plurality of created revenue bill of materials; and utilizing, by the computer, the plurality of created revenue bill of materials to determine the revenue bill of materials for the ordered customer configurable product.

3. The computer implemented method of claim 1, further comprising the step of:

sending, by the computer, an order response to the customer for the ordered customer configurable product.

4. The computer implemented method of claim 3, wherein the order response is an invoice that includes information generated at the ordering part level.

5. The computer implemented method of claim 1, further comprising the steps of:

creating, by the computer, an accounting document for the ordered customer configurable product from the revenue bill of materials and the differentiated amortization schedules for each of the revenue components within the revenue bill of materials that require the amortization schedule; and sending, by the computer, the accounting document to one or more downstream applications.

6. The computer implemented method of claim 5, wherein the one or more downstream applications are financial applications.

7. The computer implemented method of claim 1, wherein the revenue components within the revenue bill of materials for the ordered customer configurable product include both priced revenue components and non-priced revenue components.

8. The computer implemented method of claim 7, wherein the non-priced revenue components are deferred revenue accounted to at least one of a service agreement or a warranty associated with the ordered customer configurable product.

9. The computer implemented method of claim 1, wherein the revenue components within the revenue bill of materials for the ordered customer configurable product include both fixed revenue components and percentage revenue components.

10. The computer implemented method of claim 9, wherein each of the percentage revenue components are a percentage of a total price of the ordered customer configurable product.

11. The computer implemented method of claim 9, further comprising:

allocating, by the computer, a partial credit adjustment to an invoiced quantity of the ordered customer configurable product only to the percentage revenue components within the revenue bill of materials for the ordered customer configurable product according to their respective percentage amounts while excluding the fixed revenue components.

12. The computer implemented method of claim 1, wherein the revenue components include revenue sub-components.

13. The computer implemented method of claim 1, wherein the computer uses an algorithm to unbundle the revenue components within the revenue bill of materials for the ordered customer configurable product.

14. The computer implemented method of claim 1, wherein the appropriate revenue account is a legal revenue account, and wherein the legal revenue account is an account for legally accounting for revenue.

15. The computer implemented method of claim 1, wherein the revenue components within the revenue bill of materials for the ordered customer configurable product include hardware revenue components, software revenue components, service agreement revenue components, and warranty revenue components used to complete the ordered customer configurable product.

16. The computer implemented method of claim 15, wherein the step of assigning, by the computer, each of the revenue components within the revenue bill of materials to the appropriate revenue account includes the computer assigning the hardware revenue components to a hardware revenue account, the software revenue components to a software revenue account, the service agreement revenue components to a service agreement revenue account, and the warranty revenue components to a warranty revenue account.

17. A computer system for unbundling revenue, the computer system comprising:

a bus system;

a storage device connected to the bus system, wherein the storage device stores a set of instructions; and a processing unit connected to the bus system, wherein the processing unit executes the set of instructions to determine a revenue bill of materials that lists revenue components for an ordered customer configurable product in response to receiving an order for a customer configurable product from a customer; determine whether one or more of the revenue components within the revenue bill of materials for the ordered customer configurable product are amortizable; generating an amortization schedule for each of the revenue components determined to be amortizable in response to a determination that one or more of the revenue components within the revenue bill of materials for the ordered customer configurable product are amortizable; differentiate amortization schedules for each of the revenue components within the revenue bill of materials for the ordered customer configurable product that require the amortization schedule; and assign each of the revenue components within the revenue bill of materials to an appropriate revenue account.

18. The computer system of claim 17, wherein the processing unit executes a further set of instructions to create revenue bill of materials for a plurality of customer configurable products based on user input to form a plurality of created revenue bill of materials and utilize the plurality of created revenue bill of materials to determine the revenue bill of materials for the ordered customer configurable product.

19. A computer program product stored on a computer readable storage device having computer usable program code embodied thereon that is executable by a computer for unbundling revenue, the computer program product comprising:

computer usable program code for determining, by the computer, a revenue bill of materials that lists revenue components for an ordered customer configurable product in response to the computer receiving an order for a customer configurable product from a customer;

computer usable program code for determining, by the computer, whether one or more of the revenue components within the revenue bill of materials for the ordered customer configurable product are amortizable;

computer usable program code for generating, by the computer, an amortization schedule for each of the revenue components determined to be amortizable in response to a determination by the computer that one or more of the revenue components within the revenue bill of materials for the ordered customer configurable product are amortizable,;

computer usable program code for differentiating, by the computer, amortization schedules for each of the revenue components within the revenue bill of materials for the ordered customer configurable product that require the amortization schedule; and computer usable program code assigning, by the computer, each of the revenue components within the revenue bill of materials to an appropriate revenue account.

20. The computer program product of claim 19, further comprising:

computer usable program code for creating, by the computer, revenue bill of materials for a plurality of customer configurable products based on user input to form a plurality of created revenue bill of materials; and computer usable program code for utilizing, by the computer, the plurality of created revenue bill of materials to determine the revenue bill of materials for the ordered customer configurable product.

* * * * *